United States Patent [19]

Kiscaden et al.

[11] 4,218,878
[45] Aug. 26, 1980

[54] ACCELERATION MONITORING SYSTEM FOR PROTECTING GAS TURBINE AGAINST DAMAGING OPERATION AT RESONANT SPEEDS

[75] Inventors: Roy W. Kiscaden, Morton; Kermit R. Wescott, East Marlboro, both of Pa.

[73] Assignee: Westinghouse Electric Corp., Pittsburgh, Pa.

[21] Appl. No.: 900,946

[22] Filed: Apr. 28, 1978

[51] Int. Cl.² ............................................. F02C 7/26
[52] U.S. Cl. ......................... 60/39.09 R; 60/39.14 R
[58] Field of Search ................... 60/39.09 R, 39.14 R, 60/39.28 R

[56] References Cited

U.S. PATENT DOCUMENTS

| | | | |
|---|---|---|---|
| 3,382,671 | 5/1968 | Ehni | 60/39.14 R |
| 3,469,395 | 9/1969 | Spitsbergen et al. | 60/39.28 R |
| 3,520,133 | 7/1970 | Loft et al. | 60/39.14 R |
| 3,620,010 | 11/1971 | Davis | 60/39.28 R |
| 3,630,023 | 12/1971 | Lazar et al. | 60/39.28 R |
| 3,662,545 | 5/1972 | Davis | 60/39.14 R |
| 3,911,285 | 10/1975 | Yannone et al. | 60/39.28 T |
| 4,010,605 | 3/1977 | Uram | 60/39.28 R |
| 4,122,667 | 10/1978 | Hosaka et al. | 60/39.09 R |

Primary Examiner—Louis J. Casaregola
Attorney, Agent, or Firm—E. F. Possessky

[57] ABSTRACT

A fuel control schedules fuel to a gas turbine to produce a scheduled speed profile during startup. The scheduled speed profile is continuously compared to actual turbine speed during startup, and the difference is compared to an alarm setpoint and a trip setpoint. Normally, temperature and surge limit controls prevent the turbine from accelerating too fast; and, if the turbine is accelerating too slowly, an alarm output is generated when the actual/desired speed difference reaches the alarm setpoint and the turbine is tripped when the actual/desired speed difference reaches the trip setpoint.

3 Claims, 2 Drawing Figures

ACCELERATION MONITORING SYSTEM FOR PROTECTING GAS TURBINE AGAINST DAMAGING OPERATION AT RESONANT SPEEDS

BACKGROUND OF THE INVENTION

The present invention relates to gas turbine controls and more particularly to gas turbine startup speed monitors.

In the operation of a power plant gas turbine, there are certain relatively narrow critical speed ranges where resonant conditions occur and costly stress damage or failure of blades and other parts can occur if the turbine is operated at those speeds for even relatively brief periods of time. Although turbine startup normally calls for smooth and continuous increasing speed from ignition to synchronism, the turbine may develop some problem or other circumstances may arise which cause the turbine temperature limit or surge control to hold the turbine at a particular speed for some time.

Protection has conventionally been provided against turbine operation at resonant speeds by the use of a plurality of sequence timers which cause the turbine to trip if the turbine fails to reach a designated higher speed from a designated lower speed within a preset time period measured by the timer associated with that part of the startup sequence. One difficulty with the sequence-timer approach is that the turbine may reach and operate at a critical speed during most of the measured time period, thereby creating the possibility that significant stress damage or part failure will occur before the turbine is signalled to trip by the timer.

SUMMARY OF THE INVENTION

The present invention is directed to achieving better turbine protection against resonant operation during startup. Means are provided for generating an actual turbine speed signal and a reference speed signal which increases over time in accordance with the desired turbine startup speed profile. The two signals are compared and an alarm signal is generated if the difference reaches a first level and a turbine trip signal is generated if the difference reaches a second higher level.

DESCRIPTION OF THE PREFERRED EMBODIMENT

Figure 1:
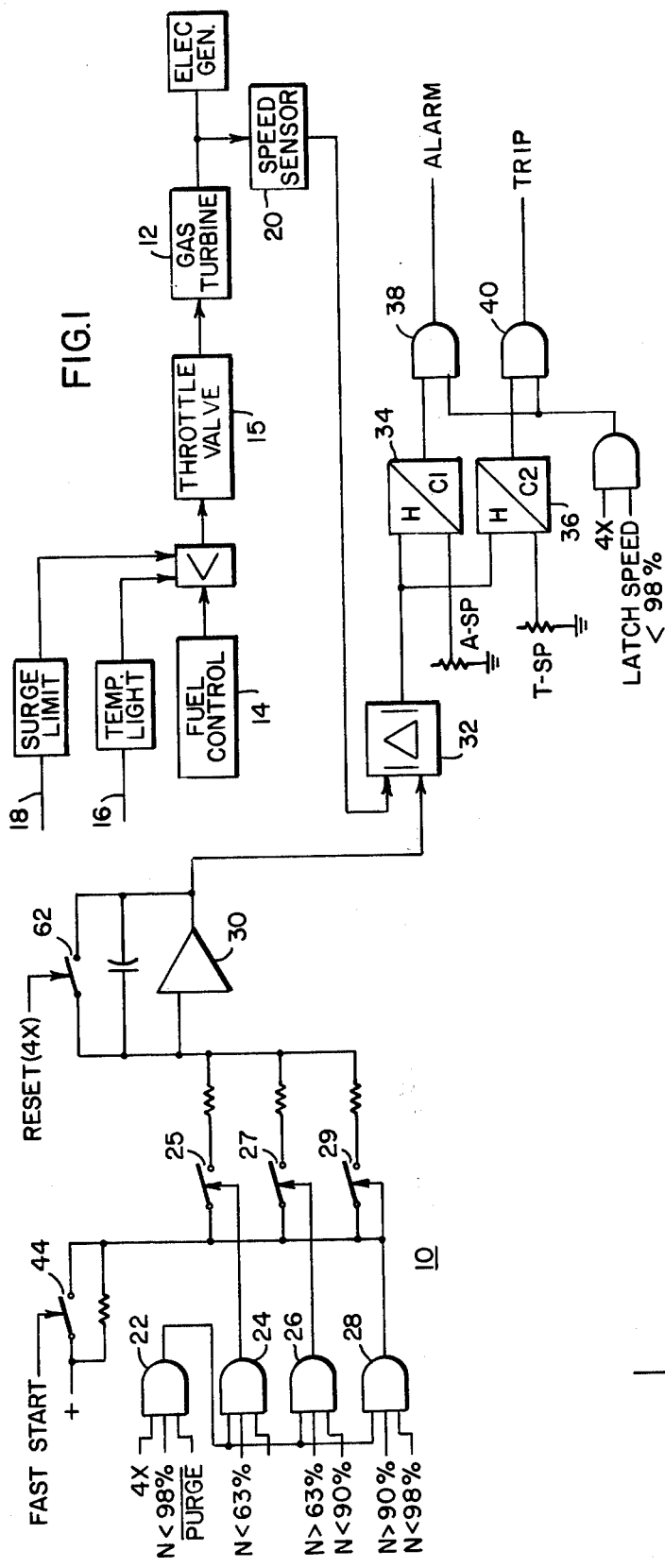
FIG. 1 shows a block diagram of a turbine acceleration monitor system arranged in accordance with the principles of the invention.

More particularly, there is shown in FIG. 1 an acceleration monitoring system 10 for a gas turbine 12. A fuel control 14 operates a throttle valve 15 in accordance with a stored fuel schedule which normally causes the turbine 12 to be energized such that it moves from ignition to synchronous speed in accordance with a desired speed profile. If the turbine 12 is slowed in its startup, as by override operation of a temperature limit control 16 or a surge limit control 18, the acceleration monitoring system 10 provides turbine protection by alarm and turbine trip actions under preset conditions.

Logic permissives must first exist before acceleration monitor protection becomes operational. Thus, in this case, a master sequence forcing relay 4X must first be on the turbine 12 must not be in the process of purging which occurs during multiple ignition attempts. In addition, turbine speed must be less than 98% rated. When the logic permissives are satisfied, AND block 22 generates an enabling signal for ramp control logic blocks 24, 26 and 28.

The actual turbine speed is indicated by a signal from a speed sensor 20. If the turbine speed is less than 63% rated speed, AND gate 24 operates switch 25. Similarly, AND gate 26 operates switch 27 when the turbine speed is between 63% and 90% rated and AND gate 28 operates switch 29 when the turbine speed is between 90% and 98% rated.

Figure 2:
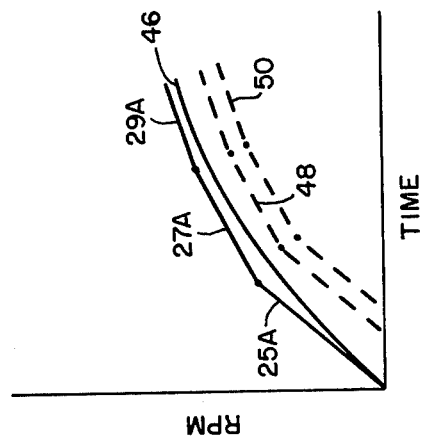
FIG. 2 shows a desired turbine startup speed profile and a typical actual startup speed profile in which no alarm or trip is generated because actual speed is close enough to desired speed over the whole range.

Generally, an amplifier 30 is connected as an integrator having a time constant determined by $C_1$, $R_1$, $R_2$ and $R_3$. In this instance, as shown in FIG. 2, the circuit is arranged to generate a speed versus time profile having three straight-line segments 25A, 27A and 29A which approximate the desired startup speed profile.

The turbine mechanical designers normally specify the desired turbine startup speed profile which will provide long turbine life. As already indicated, one problem has been that although existing turbine controls have generally provided for startup acceleration, they have not provided adequate protection against a turbine hold at a resonant speed.

During the first speed range, current flows through resistor $R_1$ to the integrating capacitor $C_1$ in proportion to the supply voltage and the value of $R_1$. The output speed reference rises per ramp 25A.

The absolute value of the difference between the speed reference and actual speed is calculated in block 32 and compared with individual alarm and trip setpoints in comparators 34 and 36. AND gates 38 and 40 prevent alarms and trips when master relay 4X is not operated or when actual speed is greater than 98% rated. Switch 62 resets the integrator and thus the speed reference to zero when master relay 4X drops out. Switch 44 is closed when a fast start is required which increases the rate of all speed references.

Similarly, during the second and third speed ramps, the output from the amplifier represents the speed reference per ramps 27A and 29A, respectively, and the difference between the actual and reference speeds is compared to the alarm and trip setpoints. Normally, the turbine accelerates along a speed profile such as the profile 46 in FIG. 2. If at any time the actual turbine speed drops to alarm profile 48, an alarm is generated. If the turbine speed drops to trip profile 50, the turbine 12 is tripped.

One main advantage of the described system is that it provides continuous monitoring of the startup acceleration profile without the use of multiple sequence timers. Further, acceleration is monitored with equal resolution at any discrete speed providing better accuracy than discrete sequence timers.

What is claimed is:

1. An improved acceleration monitoring system for protecting a gas turbine against resonant speed operation, said system comprising means for generating a signal representative of actual turbine speed, means for generating a reference signal which substantially represents desired turbine startup speed as a continuous function of time, means for continuously comparing the actual and reference speed signals and for generating an output representing the difference, means for generating an alarm signal when the difference output reaches a first value which indicates the pssibility of an undesired hold at a resonant speed, and means for generating a turbine trip signal when the difference output reaches a predetermined second value higher than the first value.

2. A system as set forth in claim 1 wherein said reference signal generating means includes first means for generating a first ramp signal having a first slope over a first turbine speed range, second means for generating a second ramp signal having a second slope less than the first slope over a second turbine speed range, and third means for generating a third ramp signal having a third slope less than the second slope over a third turbine speed range.

3. A system as set forth in claim 2 wherein the first speed range is from 0% rated to about 60% rated, the second speed range is from about 60% rated to about 90% rated and the third speed range is from about 90% rated to about 98% rated.

* * * * *